US00RE41755E

(19) United States
(12) Reissued Patent
Chahal et al.

(10) Patent Number: US RE41,755 E
(45) Date of Reissued Patent: Sep. 28, 2010

(54) ELECTRONIC DEVICE

(75) Inventors: Mindy Chahal, Menlo Park, CA (US); Nicolas Denhez, Austin, TX (US); Troy Hulick, Saratoga, CA (US); Kenneth A. Jenks, Capitola, CA (US); Scott Lincke, Rockville, MD (US); Steven Shiozaki, Belmont, CA (US); May Tsoi, Fremont, CA (US); Gil Wong, El Dorado Hills, CA (US); Max Yoshimoto, San Francisco, CA (US)

(73) Assignee: Palm, Inc., Sunnyvale, CA (US)

(21) Appl. No.: 29/243,233

(22) Filed: Nov. 18, 2005

(Under 37 CFR 1.47)

Related U.S. Patent Documents

Reissue of:
(64) Patent No.: Des. 482,360
Issued: Nov. 18, 2003
Appl. No.: 29/149,426
Filed: Oct. 10, 2001

(51) LOC (9) Cl. ..... 14-02
(52) U.S. Cl. ..... D14/346
(58) Field of Classification Search ..... D14/341–346, D14/336, 138; D18/1, 2, 7; 341/22, 23; 235/145 A, 235/145 R; 345/156, 168, 169, 172, 173; 349/12; 361/679.01–679.03, 679.09
See application file for complete search history.

(56) References Cited

U.S. PATENT DOCUMENTS

| | | | | | |
|---|---|---|---|---|---|
| D341,823 | S | * | 11/1993 | Sakai | D14/341 |
| D346,793 | S | * | 5/1994 | Iino et al. | D14/341 |
| D389,465 | S | * | 1/1998 | Heiman et al. | D14/336 |
| D419,993 | S | * | 2/2000 | Silzer, Jr. | D14/138 |
| D423,468 | S | * | 4/2000 | Jenkins | D14/342 |

* cited by examiner

*Primary Examiner*—Freda S Nunn
(74) *Attorney, Agent, or Firm*—Foley & Lardner LLP

(57) CLAIM

We claim the ornamental design for [the handheld computer,] *an electronic device*, as shown and described.

DESCRIPTION

Figure 1:
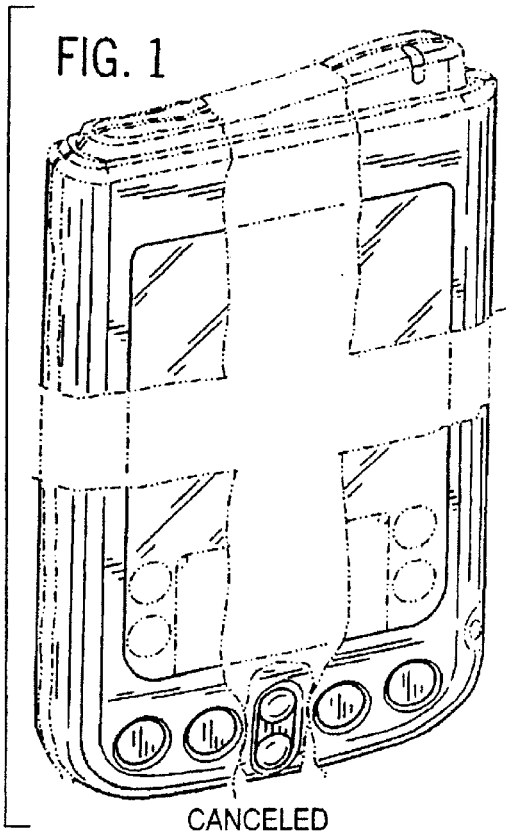
Figure 4:
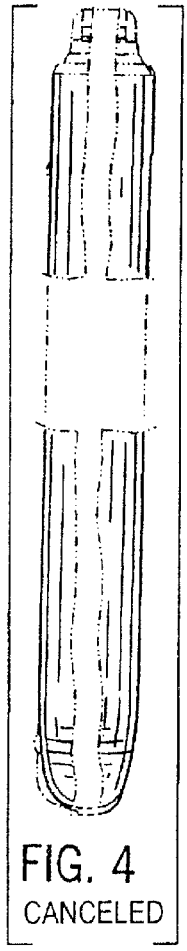
Figure 5:
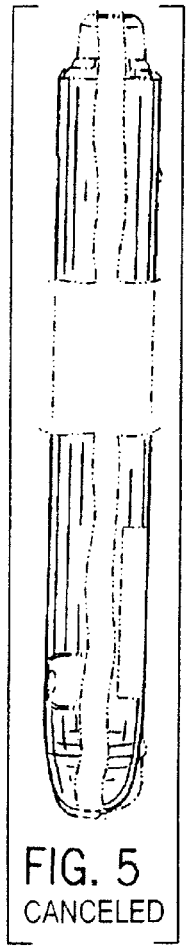
Figure 6:
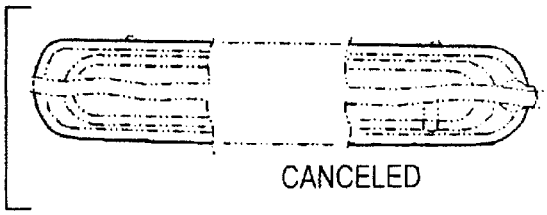
Figure 7:
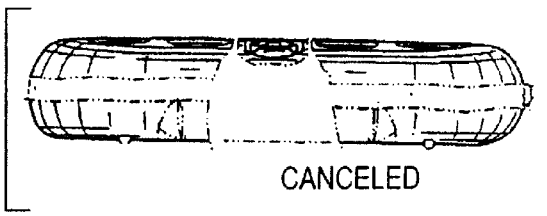
Figure 3:
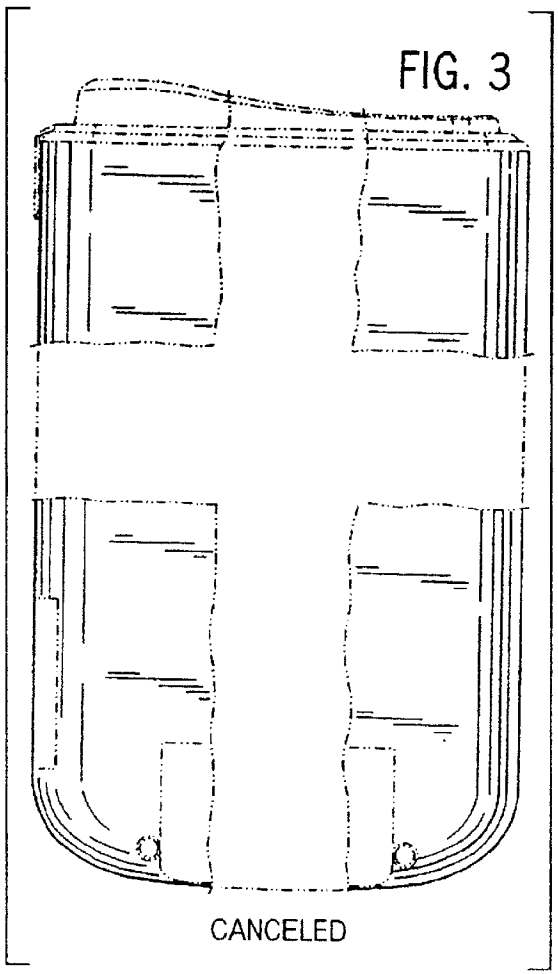
Figure 2:
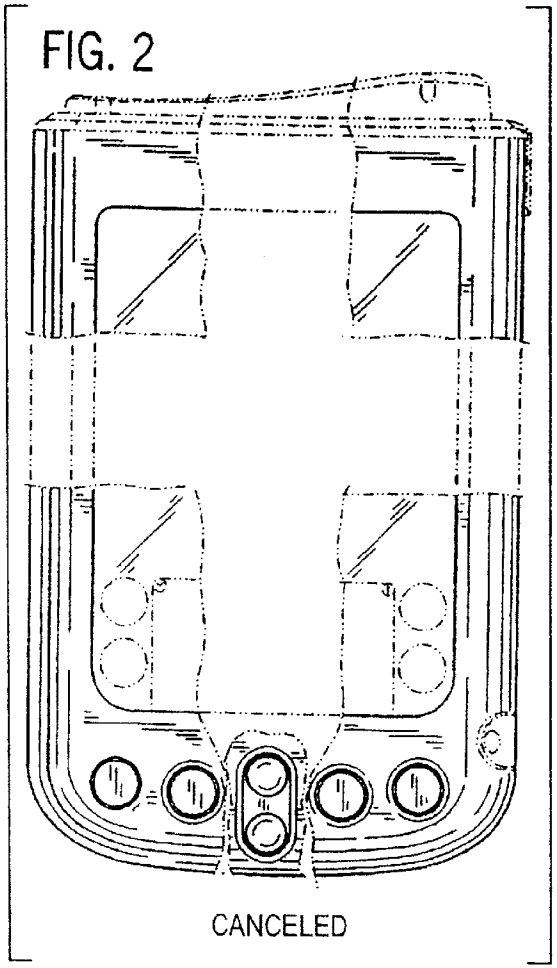
Figure 14:
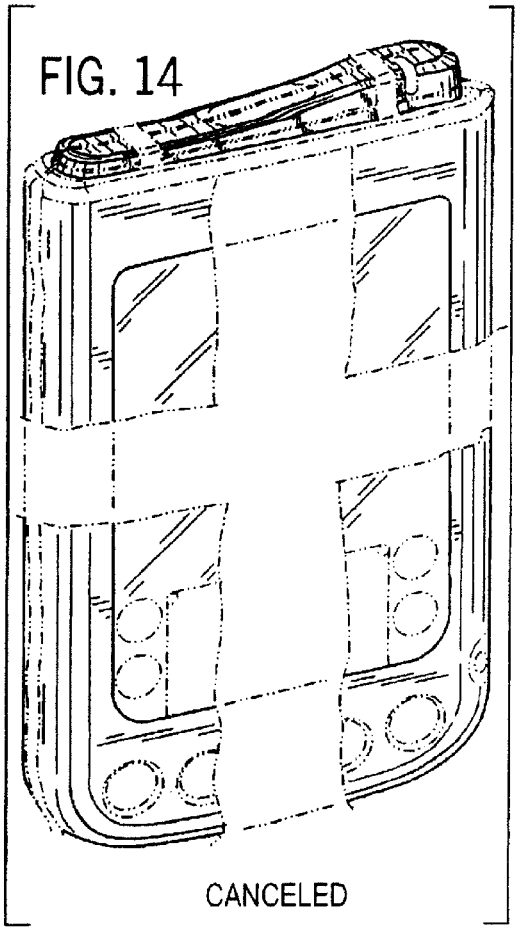
Figure 17:
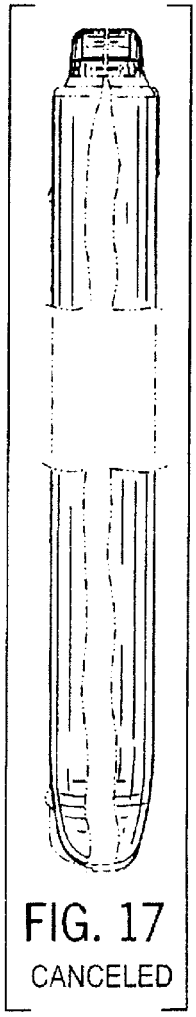
Figure 18:
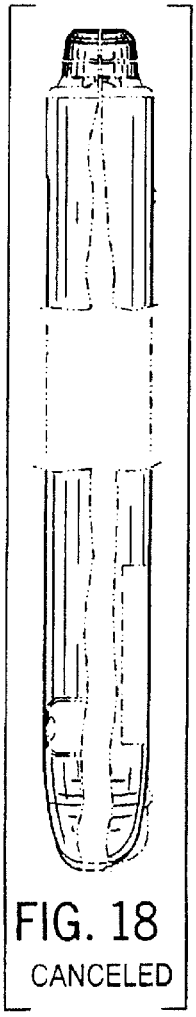
Figure 19:
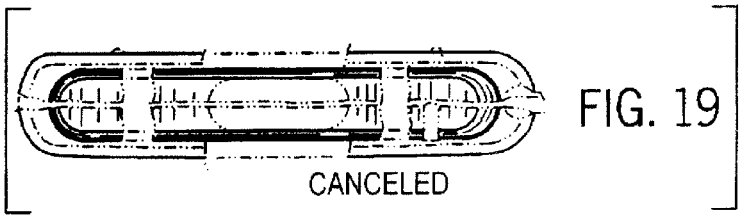
Figure 20:
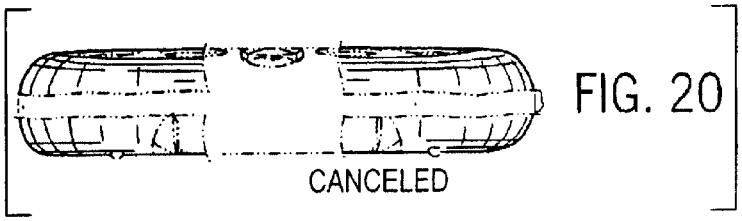
Figure 16:
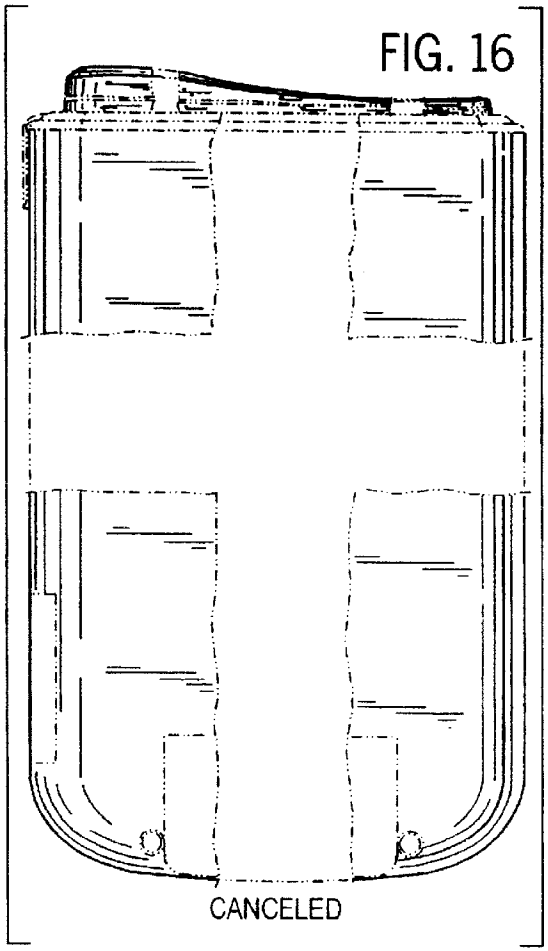
Figure 15:
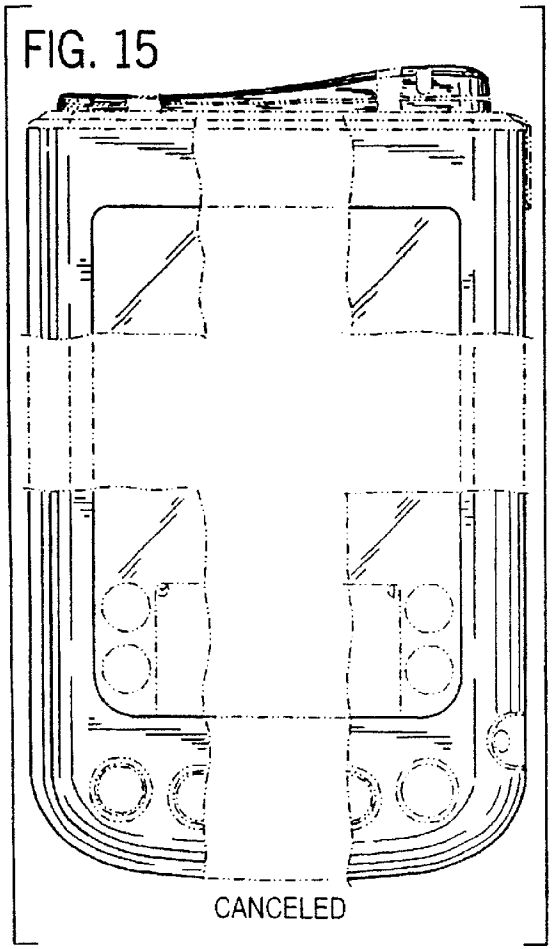

[FIG. 1 is a perspective view of a handheld computer.]
[FIG. 2 is a front elevation view.]
[FIG. 3 is a rear elevation view.]
[FIG. 4 is a left side elevation view.]
[FIG. 5 is a right side elevation view.]
[FIG. 6 is a top plan view.]
[FIG. 7 is a bottom plan view.]
FIG. 8 is a perspective view of an [alternative embodiment of the handheld computer] *electronic device*.
FIG. 9 is a front elevation view.
FIG. 10 is a left side elevation view.
FIG. 11 is a right side elevation view.
FIG. 12 is a top plan view.
FIG. 13 is a bottom plan view.
[FIG. 14 is a perspective view of an alternative embodiment of the handheld computer.]
[FIG. 15 is a front elevation view.]
[FIG. 16 is a rear elevation view.]
[FIG. 17 is a left side elevation view.]
[FIG. 18 is a right side elevation view.]
[FIG. 19 is a top plan view; and,]
[FIG. 20 is a bottom plan view.]
[The broken line disclosure is for illustrative purposes only and forms no part of the claimed design. The handheld computer shown is a design including elements which may be shown on one side (left or right) of the handheld computer, but may be located on the other side instead. Accordingly, the complementary design for an handheld computer, described by a mirror image of FIGS. 1-20 is considered within the scope of the claimed design.] *The cross-like broken lines that divide the length, width, and thickness of the electronic device represent boundaries of the claimed design. The long solid lines with dash-dot-dash breaks surrounding the innermost perimeter of the display window which includes oblique line shading represent the boundaries of the display window. Further, the dash-dot-dot-dash broken lines surrounding the entire front panel of the device also represent the boundary lines. The remaining broken lines illustrate unclaimed portions of the electronic device.*

1 Claim, 6 Drawing Sheets

Matter enclosed in heavy brackets [ ] appears in the original patent but forms no part of this reissue specification; matter printed in italics indicates the additions made by reissue.

CANCELED

CANCELED

FIG. 8
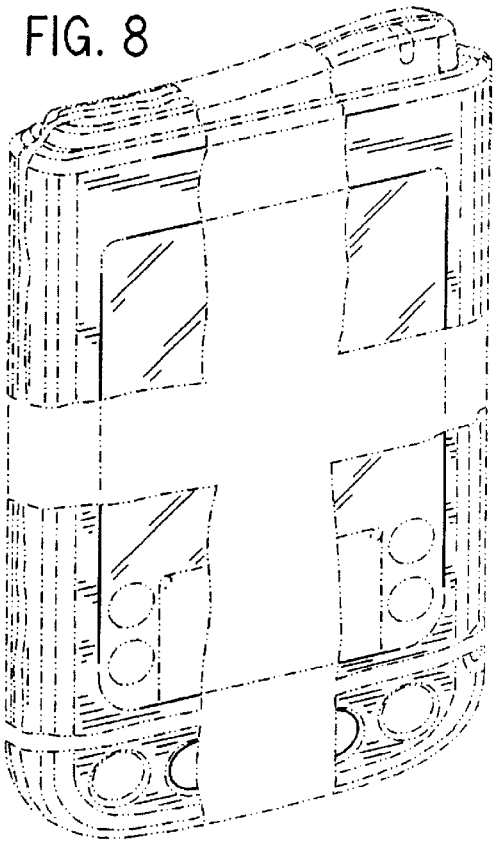
AMENDED
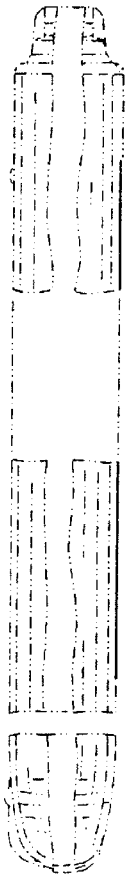
AMENDED
FIG. 10
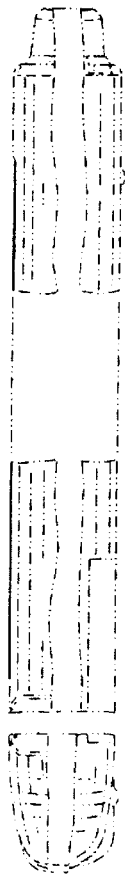
AMENDED
FIG. 11
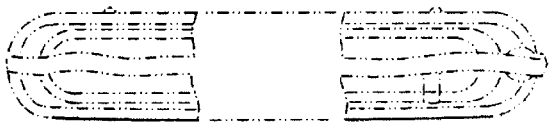
AMENDED
FIG. 12
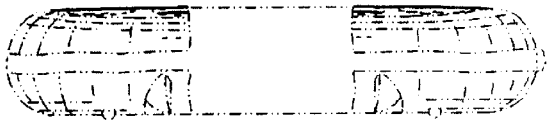
AMENDED
FIG. 13

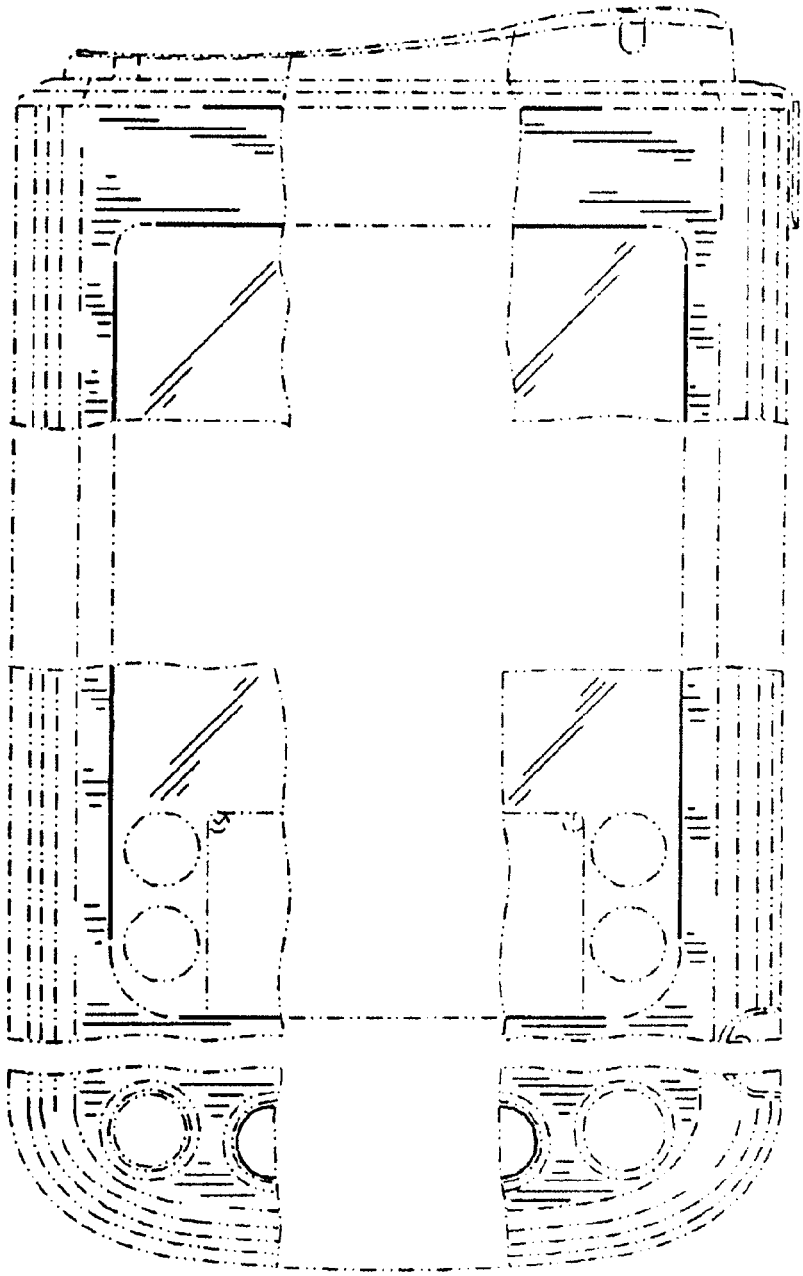
AMENDED
FIG. 9

CANCELED

CANCELED

CANCELED

CANCELED

CANCELED